United States Patent
Monereau et al.

(10) Patent No.: US 12,370,491 B2
(45) Date of Patent: Jul. 29, 2025

(54) METHOD FOR ADJUSTING AN OXYGEN PRODUCTION UNIT WITH DIFFERENT SET POINTS FOR EACH ADSORBER

(71) Applicant: L'Air Liquide, Société Anonyme pour l'Etude et l'Exploitation des Procédés Georges Claude, Paris (FR)

(72) Inventors: Christian Monereau, Montpellier (FR); David Bigot, Villepreux (FR); Marie Dehestru, Montigny-le-Bretonneux (FR)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 566 days.

(21) Appl. No.: 17/613,597

(22) PCT Filed: May 12, 2020

(86) PCT No.: PCT/EP2020/063221
§ 371 (c)(1),
(2) Date: Nov. 23, 2021

(87) PCT Pub. No.: WO2020/234055
PCT Pub. Date: Nov. 26, 2020

(65) Prior Publication Data
US 2022/0233995 A1 Jul. 28, 2022

(30) Foreign Application Priority Data
May 23, 2019 (FR) .................................. 1905447

(51) Int. Cl.
*B01D 53/02* (2006.01)
*B01D 53/04* (2006.01)
*B01D 53/047* (2006.01)

(52) U.S. Cl.
CPC ...... *B01D 53/0476* (2013.01); *B01D 53/0446* (2013.01); *B01D 2256/12* (2013.01);
(Continued)

(58) Field of Classification Search
CPC ............ B01D 2256/12; B01D 2256/16; B01D 2256/18; B01D 2256/20; B01D 2256/22;
(Continued)

(56) References Cited

U.S. PATENT DOCUMENTS 4,693,730 A 9/1987 Miller
6,277,174 B1 8/2001 Neu et al.
(Continued)

FOREIGN PATENT DOCUMENTS

EP 1 374 973 1/2004
EP 1 517 738 3/2005
(Continued)

OTHER PUBLICATIONS

International Search Report for corresponding PCT/EP2020/063221, Oct. 12, 2020.

*Primary Examiner* — Christopher P Jones
(74) *Attorney, Agent, or Firm* — Elwood L. Haynes

(57) ABSTRACT

A method for adjusting a gas stream separation unit having N adsorbers, where N≥2, each following a PSA, VSA or VPSA adsorption cycle, with a time lag of a phase time, said adjustment method including continuously measuring a physical parameter associated with the gas stream entering and/or leaving the adsorber; for at least one step of the adsorption cycle, determining at least one characteristic value of the step chosen in step a) which is selected from the values of the physical parameter measured in step a) or a function of those values; comparing this characteristic value with a target value; and modifying the flow of the gas stream in order to obtain the target value, in the event of a variation (Continued)

between the value of this (these) difference(s) and the target values.

7 Claims, 2 Drawing Sheets

(52) U.S. Cl.
CPC .............. *B01D 2259/40009* (2013.01); *B01D 2259/403* (2013.01)

(58) Field of Classification Search
CPC ........ B01D 2256/245; B01D 2257/104; B01D 2257/108; B01D 2257/11; B01D 2257/502; B01D 2257/504; B01D 2257/7025; B01D 2259/40; B01D 2259/40007; B01D 2259/40009; B01D 2259/403; B01D 53/0446; B01D 53/047; B01D 53/0476; C01B 13/00; C01B 23/00; C01B 32/40; C01B 32/50; Y02C 20/20; Y02C 20/40; Y02P 20/151; Y02P 20/156

See application file for complete search history.

(56) References Cited

U.S. PATENT DOCUMENTS

| | | | |
|---|---|---|---|
| 2009/0211438 A1* | 8/2009 | Thompson | B01D 53/047 95/22 |
| 2010/0098491 A1* | 4/2010 | Monereau | B01D 53/0476 95/21 |
| 2016/0023155 A1* | 1/2016 | Ramkumar | B01D 53/0476 96/113 |
| 2016/0346723 A1* | 12/2016 | Honore | C07C 7/12 |
| 2019/0010949 A1* | 1/2019 | Swindlehurst | F04D 27/0261 |

FOREIGN PATENT DOCUMENTS

| | | |
|---|---|---|
| EP | 1 880 753 | 1/2008 |
| EP | 2 878 356 | 6/2015 |
| KR | 2017 0087954 | 7/2017 |

* cited by examiner

[Fig.1]
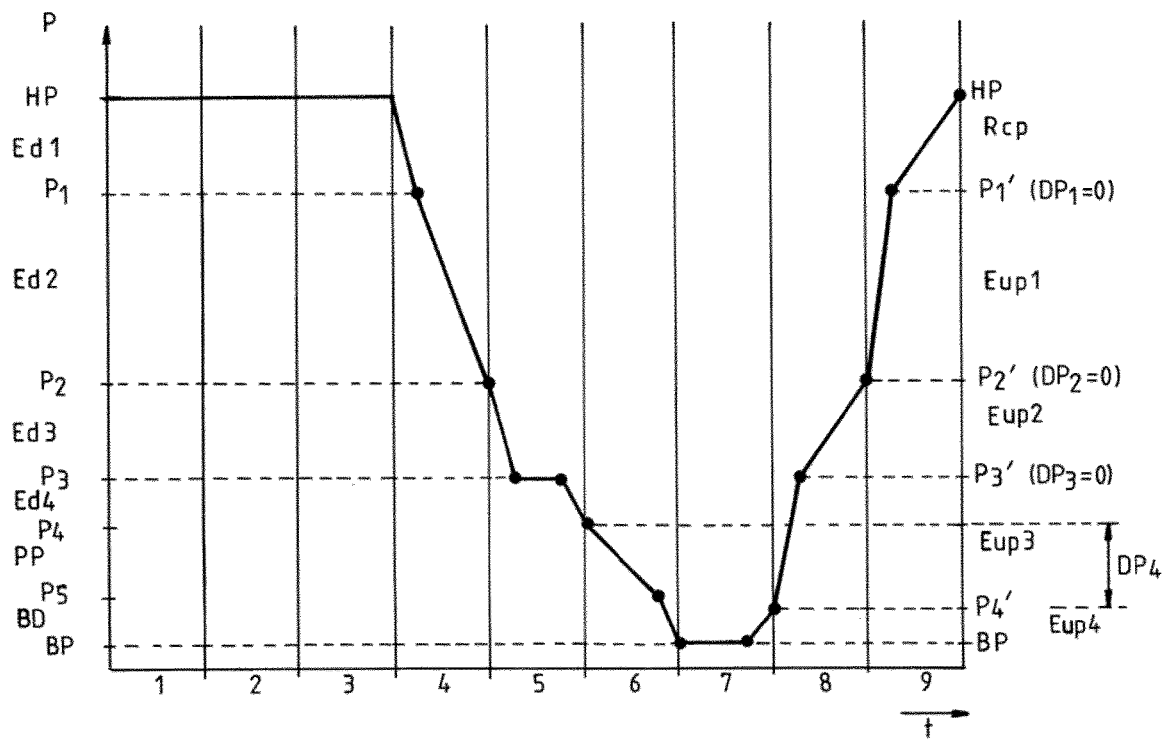
[Fig.2]
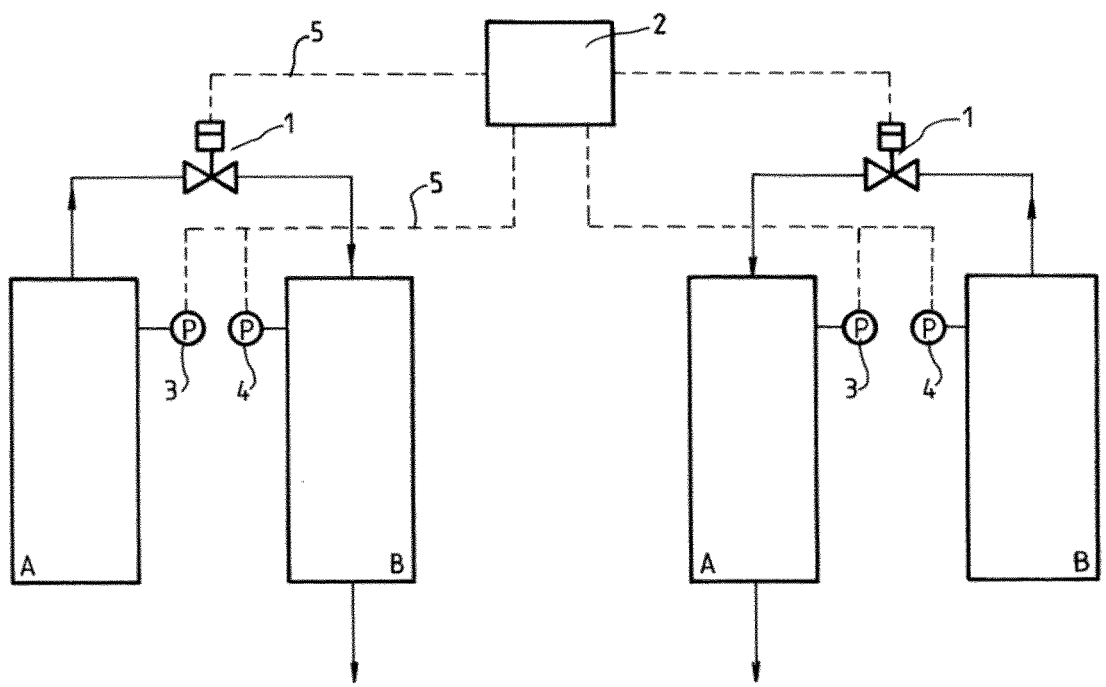

[Fig.3]
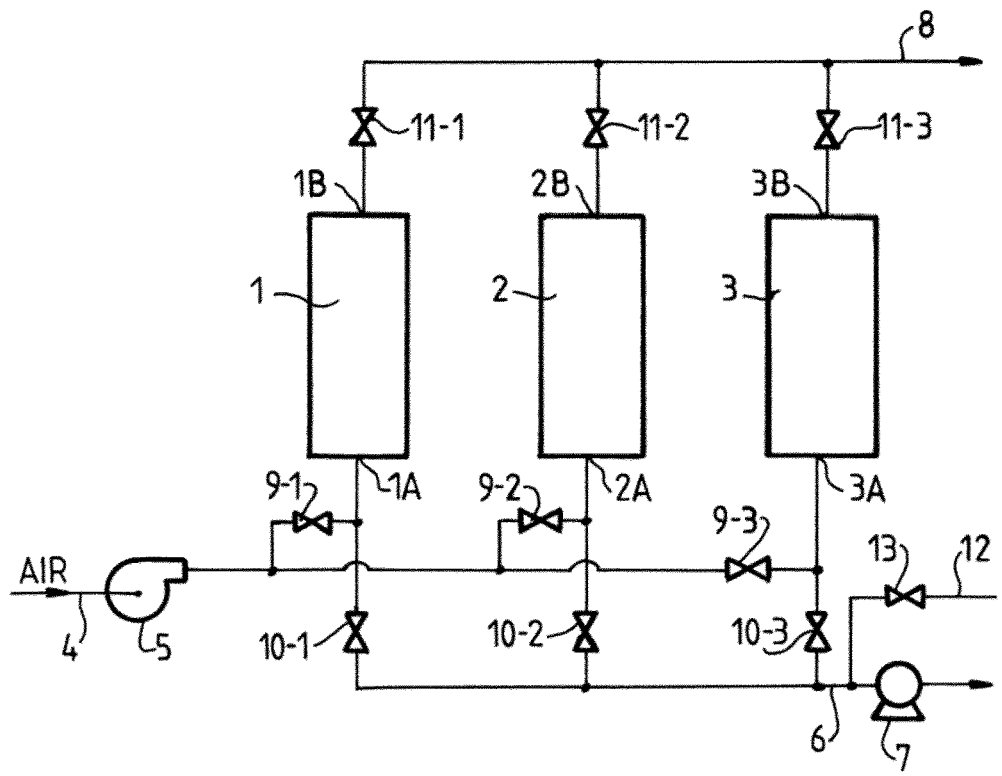
[Fig.4]
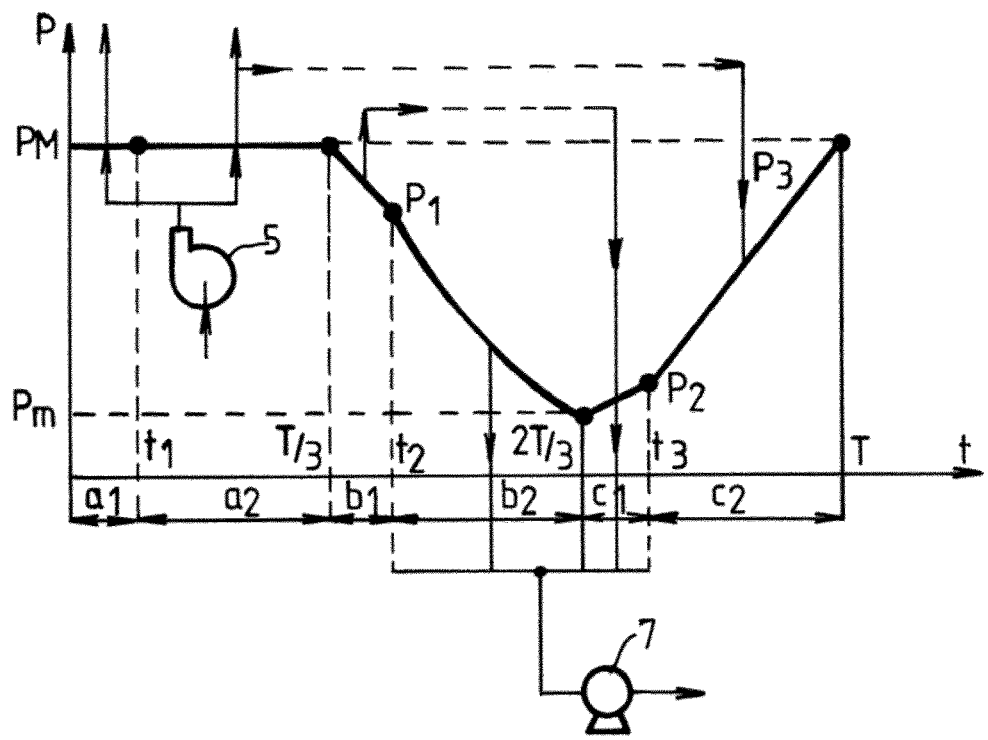

METHOD FOR ADJUSTING AN OXYGEN PRODUCTION UNIT WITH DIFFERENT SET POINTS FOR EACH ADSORBER

CROSS REFERENCE TO RELATED APPLICATIONS

This application is a 371 of International Application No. PCT/EP2020/063221, filed May 12, 2020, which claims priority to French Patent Application No. 1905447, filed May 23, 2019, the entire contents of which are incorporated herein by reference.

BACKGROUND

The present invention relates to a method for adjusting a gas stream separation unit comprising adsorbers that follow a PSA, VSA or VPSA pressure cycle.

Generally speaking, a gas phase adsorption process can be used to separate one or more molecules from a gas mixture containing said molecules, by utilizing the difference in affinity of one or more adsorbents for the various constituent molecules of the mixture. The affinity of an adsorbent for a molecule depends partly on the structure and composition of the adsorbent and partly on the properties of the molecule, particularly its size, electronic structure and multipole moments. An adsorbent can be, for example, a zeolite, an activated carbon, an optionally doped activated alumina, a silica gel, a carbon molecular sieve, an organometallic structure, an alkaline or alkaline-earth metal oxide or hydroxide, or a porous structure preferably containing a substance capable of reversibly reacting with the molecules, such as amines, physical solvents, metal complexing agents, metal oxides or hydroxides, for example.

The most commonly used adsorbent materials are in the form of particles (beads, sticks, crushed materials, etc.), but they can also be found in structured form, such as monoliths, wheels, parallel passage contactors, fabrics, fibres, etc.

There are 3 main families of adsorption processes: sacrificial charge processes, TSA (temperature swing adsorption) processes and lastly PSA (pressure swing adsorption) processes.

In sacrificial charge processes—the term "guard beds" is often used in this case—a new charge is introduced when the existing charge is saturated with impurities, or more generally when it is no longer able to provide adequate protection.

In TSA processes, the adsorbent, at the end of use, is regenerated in situ, that is to say that the impurities captured are discharged in order for said adsorbent to recover the greater part of its adsorption capabilities and to be able to recommence a purification cycle, the main regeneration effect being due to a rise in temperature.

Lastly, in PSA processes, the adsorbent, at the end of the production phase, is regenerated by desorption of the impurities, which is achieved by means of a fall in their partial pressure. This fall in pressure can be achieved by a fall in the total pressure and/or by flushing with a gas devoid of or containing little in the way of impurities.

This last process, PSA, is of interest here.

Pressure swing adsorption processes are used both to eliminate traces of impurities—for example, in levels below 1% in the feed gas—and to separate mixtures containing several tens of percent of different gases. The first case is generally referred to as purification (gas drying, for example) and the second case as separation (producing oxygen or nitrogen from atmospheric air, for example). In the most complex cases, purification and separation can of course take place in the same unit.

SUMMARY

A method for adjusting a gas stream separation unit having N adsorbers, where N≥2, each following a PSA, VSA or VPSA adsorption cycle, with a time lag of a phase time, said adjustment method including continuously measuring a physical parameter associated with the gas stream entering and/or leaving the adsorber; for at least one step of the adsorption cycle, determining at least one characteristic value of the step chosen in step a) which is selected from the values of the physical parameter measured in step a) or a function of those values; comparing this characteristic value with a target value; and modifying the flow of the gas stream in order to obtain the target value, in the event of a variation between the value of this (these) difference(s) and the target values.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 illustrates a typical pressure cycle for a PSA-H2, as known in the prior art.

FIG. 2 illustrates a schematic representation of one embodiment of the present invention.

FIG. 3 illustrates a schematic representation of one embodiment of the present invention.

FIG. 4 illustrates a schematic representation of one embodiment of the present invention.

DETAILED DESCRIPTION OF PREFERRED EMBODIMENTS

In the context of the present invention, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

VSA processes, in which the adsorption is carried out substantially at atmospheric pressure, preferably between 0.95 and 1.25 bar abs, and the desorption pressure is lower than atmospheric pressure, typically from 50 to 400 mbar abs.

MPSA or VPSA processes, in which the adsorption is carried out at a high pressure greater than atmospheric pressure, typically between 1.4 and 6 bar abs, and the desorption is carried out at a low pressure lower than atmospheric pressure, generally between 200 and 600 mbar abs.

PSA processes properly speaking, in which the high pressure is substantially greater than atmospheric pressure, typically between 3 and 50 bar abs, and the low pressure is substantially equal to or greater than atmospheric pressure, generally between 1 and 9 bar abs.

RPSA (Rapid PSA) processes, for which the duration of the pressure cycle is typically less than a minute.

URPSA (Ultra Rapid PSA) processes, for which the duration of the pressure cycle is of the order of a maximum of a few seconds.

It should be noted that these various designations are not standardized and that the limits are subject to variation. Once again, unless otherwise stated, the use of the term PSA here covers all of these variants.

It is also noted that the gas fraction recovered in a PSA process can correspond to the fraction produced at the high pressure but also to the fraction extracted at the low pressure once the constituents of interest are the most adsorbable in the mixture.

An adsorber will thus begin a period of adsorption at the high pressure until it is loaded with the constituent or constituents to be captured and will then be regenerated by depressurization and extraction of the adsorbed compounds, before being restored in order to again begin a new adsorption period. The adsorber has then completed a "pressure cycle" and the very principle of the PSA process is to link together these cycles one after the other; it is thus a cyclical process. The time which an adsorbent takes to return to its initial state is known as cycle time. In principle, each adsorber follows the same cycle with a time lag, which is known as phase time or more simply phase. The following relationship thus exists:

phase time=cycle time/number of adsorbers and it is seen that the number of phases is equal to the number of adsorbers.

This cycle thus generally comprises periods of:

Production or Adsorption, during which the feed gas is introduced via one of the ends of the adsorber, the most adsorbable compounds are adsorbed preferentially and the gas enriched with the least adsorbable compounds (product gas) is extracted via the second end. The adsorption can be carried out at an increasing pressure, at a substantially constant pressure or even at a slightly decreasing pressure. The term HP pressure (high pressure) is used to denote the adsorption pressure.

Depressurization, during which a portion of the compounds present in the adsorbent and in the free spaces is released from the adsorber, which is no longer supplied with feed gas, via at least one of its ends. Taking as reference the direction of circulation of the fluid in the adsorption period, it is possible to define co-current, counter-current or simultaneously co- and counter-current depressurizations.

Elution or Purge, during which a gas enriched with the least adsorbable constituents (purge gas) circulates through the adsorbent bed in order to help in the desorption of the most adsorbable compounds. Purging is generally performed counter-currently.

Repressurization, during which the adsorber is at least partially repressurized before again starting an Adsorption period. Repressurization can take place counter-currently and/or co-currently.

Dead time, during which the adsorber remains in the same state. These dead times can form an integral part of the cycle, making it possible to synchronize steps between adsorbers, or form part of a step which has finished before the allotted time. The valves can be closed or remain in the same state, depending on the characteristics of the cycle.

When the recovered product is made up of the most adsorbable constituents, a Rinse step can be added, which involves circulating a gas enriched with the most adsorbable constituents co-currently in the adsorber, with the aim of driving the least adsorbable compounds out of the adsorbent and the dead spaces. This Rinse step can be carried out at any pressure between the high pressure and the low pressure and generally uses a fraction of the low-pressure product following compression. The gas extracted from the adsorber during this step can be used for various purposes (secondary production of gas enriched with the least adsorbable constituents, repressurization, elution, fuel gas network, etc.).

Similarly, some PSA processes include a Displacement step, in which a fluid is used, often outside the PSA itself, to push the least adsorbed gas towards the outlet and thereby to increase production.

Depressurization and Repressurization can be carried out in different ways, especially when the PSA unit comprises a plurality of adsorbers (or vessels). This thus leads to elementary steps being defined in order to more exactly describe the gas transfers which occur between adsorbers (or vessels) and with the external environment (feed circuits, product gas circuits, low-pressure gas circuits).

Thus, the gas discharged during the depressurization period can:

Be used to repressurize one or more adsorbers, which are then at lower pressure; this is referred to as Equalization at decreasing pressure or Equalization Down (Ed)

Serve as an elution gas (purge gas) to help with desorbing the most adsorbable constituents from an adsorber at low pressure; this is referred to as Purge Providing (PP)

Be discharged to the low-pressure network or to the atmosphere; this is referred to as LP Decompression or Blow Down (BD)

Similarly, the gas received by an adsorber during Repressurization can originate:

In part from the purge gas if this is carried out at increasing pressure. This step is still referred to as the Elution or Purge (P) step, optionally specifying that it takes place at increasing pressure (Pup).

From other adsorbers carrying out Equalizations Down (Ed). These steps are then referred to as Equalizations Up (Eup).

From the Product gas: Rep Pr

From the Feed gas: Rep F. The feed gas can be compressed before being introduced into the adsorber if the adsorption pressure is greater than the pressure at which the gas is available.

Note that the adsorption step (production of the least adsorbable gas fraction) can take place at increasing pressure or even at slightly decreasing pressure, depending on the cycles used. The opening of the (production) output valve generally defines the start of the adsorption step, even if there has already been adsorption of various compounds during certain repressurization steps (Rep F in particular), and that regeneration can take place under vacuum, the gas being extracted using a pump or other equipment having the same function (ejector, blower, etc.); this step is then instead referred to as the Pumping step. Nevertheless, for more general applicability, the term Depressurization will be retained here.

The role of the equalizations is described in more detail here. They allow for the recovery of some of the least adsorbable compounds, which are contained in the dead spaces (intergranular spaces in the case of a bed of particulate adsorbents, channels in the case of structured adsorbents, ends of the adsorber, etc.) or which are (poorly)

adsorbed. Since these constituents are no longer lost in the residue, the Extraction Yield of the poorly adsorbable gases, which is defined as the fraction recovered during Production relative to the amount contained in the feed gas, can be increased.

Since at least some of the Equalizations Down are performed co-currently in order to be effective, the most adsorbed compounds tend to progress towards the outlet end. As it is desirable is to keep them in the adsorber, this leads to the provision of an additional amount of adsorbent. The increased yield associated with the equalizations results in larger adsorbers.

Once there is a plurality N of adsorbers, multiple equalizations are possible, the adsorber that is being depressurized supplying gas successively to various adsorbers at a lower initial pressure.

An equalization may be considered complete if at the end of the substep the pressures of the 2 adsorbers are identical (within ten millibars, for example) or partial (incomplete) if the gas exchange is interrupted before the end, leaving a substantial pressure difference between the 2 adsorbers, for example if the pressure variation in the adsorbers during this substep is equal to or less than 95% of what it would have been in the case of a complete equalization. The pressure difference between the two adsorbers at the end of the step can then be specified, e.g. DP2=1 bar, indicating a difference of 1 bar between adsorbers at the end of the second equalization. Unless specified in further detail, the term "equalization" covers both of the above cases.

This is illustrated in FIG. 1. A typical pressure cycle for a PSA-H2, for example, is shown. The pressure in the adsorber is plotted on the y-axis and the time on the x-axis. This cycle consists of 9 phases and must therefore comprise 9 adsorbers. We will describe the evolution over time for an adsorber which is assumed to have just finished being regenerated and repressurized and which is therefore starting its adsorption period (production period if, as assumed here, it is the least adsorbable gas that is being recovered).

This adsorber, referred to hereafter as R01, is fed for 3 successive phase times with ⅓ of the flow of gas to be treated. At the end of this period, regeneration begins, which involves first recovering the maximum possible amount of light (poorly adsorbable) gas by means of 4 successive equalizations (Ed1, 2, 3 and 4), which take place during phase times 4 and 5. At the start of phase 6, gas continues to be extracted co-currently from the production. This gas (PP) will be used for elution during the purge step. At the end of phase 6, the residual pressurized gas contained in the adsorber is extracted counter-currently and forms part of the residue. A cycle of this type, comprising 4 equalizations, corresponds to the decision to favour the extraction yield of the unit over the investment. This PSA unit could be one producing more than 50,000 Nm3/h of H2, for example. Purging takes place during phase time 7, followed by Equalization up 4. This is followed by equalizations Eup 3, 2 and 1, and lastly the final repressurization.

Each of the 9 adsorbers should be considered to follow this same cycle with a time lag between the phase times. Therefore, the pressure cycle described for adsorber R01 also reflects the state at a given moment of each of the 9 adsorbers making up the PSA unit. For example, at the start of the production step, R02 is in its 2nd step and R03 is starting its last production phase, and so on.

Note that the phase times must be absolutely identical but that there are also time constraints on the substeps making up the cycle. Thus, for example, there must be simultaneity between an equalization at decreasing pressure and the corresponding equalization at increasing pressure. By simultaneity we mean not only that these steps are of the same duration but also that they are located identically in their respective phase time, for example at the start of the phase.

This leads to rigorous time management during the scaling of the unit and above all during operation, where no time lag is permissible.

With regard to scaling, it can be seen for example that equalization 3 takes place at the start of the phase, while equalization 4 occurs at the end of equalization. In this case, given the duration of these steps, a dead time has to be added (middle of phase 5).

In the case described here, the first 3 equalizations are complete (P'=P), while the 4th is incomplete, with a DP4 substantially different from zero. This may mean that the desired extraction yield has been achieved or that there is nothing more to be gained by continuing with the 4th equalization. Simulation programs can now offer a precise description of the cycle that needs to be implemented in order to achieve the required specifications, along with the nature and amount of the appropriate adsorbents.

As well as the 9 adsorbers, the PSA unit will include the necessary connections and equipment to carry out the specified flow exchanges (pipes, valves, etc.) and a monitoring and control system capable of managing all these elements.

The basic adjustment will enable the chosen pressure levels to be achieved for each of the adsorbers. In our case, assuming that the adsorption pressure HP and the regeneration pressure BP are imposed by the units upstream and downstream of the PSA (outlet from a compressor, site off-gas network, etc.), the 5 pressures P1, P2, P3, P4 and P5 still have to be controlled. The pressures during the repressurization phases (P'4, P'3, P'2, P'1) are then the result of the exchanged flows. We could show that the pressures P1, P2, P3 cannot be arbitrary values and that instead there are constraints. For that reason, in order to achieve the desired cycle, the adjustment will advantageously relate to the pressure differences at the end of equalization DP1, DP2, DP3, DP4 and to the pressure P5, the cut-off pressure between the elution gas provision step and the final countercurrent depressurization.

While pressures are clearly important criteria for PSA units, it may be necessary to directly adjust other operational elements, such as for example flow rates or amounts of gas introduced or withdrawn (adsorption, rinsing, displacement steps, etc.).

More generally, each step of a PSA cycle, whichever process is used, is characterized by the transfer of at least one amount of gas entering or leaving the adsorber—except for the dead phases, for which by definition there is no input or output. It is necessary to control these transfers in order to complete the cycle in the manner intended. This is the function of the various adjustments put in place as described above. To this end, and in accordance with the very definition of an adjustment, a physical parameter that is characteristic of the transfer (a pressure, a pressure difference as seen in the previous example, a rotational speed in the case of a machine, a flow rate, etc.) is selected, a set point value or target value (bar abs, millibar, rps, Nm3/s, etc.) is assigned along with the point at which this set point is to be considered (end of step, throughout the step, etc.), and the equipment/elements to be actuated in order to act upon the flow quantities (valve, frequency converter, timer, coefficient in a formula, etc.) are identified. The adjustment principle then involves comparing the measured value of the characteristic parameter with its set point value and acting to reduce this gap until the target value is reached. Note that the terms target value and set point are used without distinction, although the first corresponds more to the process and the second to the adjustment. Since these principles are well known, there is no need to describe the methods of implementing such a system, which may vary from one unit to another, in any further detail.

Today this applies to the N adsorbers of a PSA unit which follow the same pressure cycle with a time lag of a phase and which are controlled in the same way, each adsorber just having a different index (i, i+1, . . . ) for the system, everything else (parameters, set points, equipment/element to be actuated, etc.) remaining the same. Note, however, that the action itself may differ from one adsorber to another in order to achieve the same set point at the end. For example, to achieve the same pressure P at the end of a depressurization step, the discharge valve of adsorber 1 may be 30% open, while that of adsorber 2 may be 33% open. Typically, the function of adjustment is to manage small variations between items of equipment (associated with differences in configuration, settings, wear, etc.) in order to obtain the same end result.

However, contrary to usual practice, it seems that performance improvements can be achieved by diverging from this principle and by individualizing the cycles for each adsorber. It should be noted, however, that the variations between adsorbers that are established in this way are minor, at the level of corrections modifying the transfers by a few percent, so we can still say that these N adsorbers follow the same adsorption cycle with a time lag of a phase time.

Therefore, a subject of the invention is a method for adjusting a gas stream separation unit comprising N adsorbers, where N≥2, each following a PSA, VSA or VPSA adsorption cycle, with a time lag of a phase time, said adjustment method comprising the following steps:

a) for at least one step of the adsorption cycle, continuously measuring a physical parameter associated with the gas stream entering and/or leaving the adsorber;

b) determining at least one characteristic value of the step chosen in step a) which is selected from the values of the physical parameter measured in step a) or a function of those values;

c) comparing this characteristic value with a target value; and d) in the event of a variation between the value of this (these) difference(s) and the target values, modifying the flow of the gas stream in order to obtain the target value, e) where steps a) to d) are performed for each adsorber, and f) where at least one adsorber has a target value that differs from the target values of the other adsorbers.

The target values are preferably individualized for each adsorber.

Depending on the case, the method according to the invention may have one or more of the features below:

at least one adsorber follows a different adsorption cycle from that of the other adsorbers;

in step a), the selected step of the adsorption cycle is selected from the adsorption step, the equalization step between adsorbers or between an adsorber and a storage vessel, an elution gas provision step, a depressurization step with optional vacuum pumping, an elution step, optionally under vacuum, a repressurization step or a rinse or displacement step;

the target value is a target value corresponding to the adjustment of the adsorption cycle step, which in respect of adsorber (i) is in the form: X+delta Xi, where X is the value common to all the adsorbers and delta Xi is the correction to be made to said common value for adsorber (i);

the target values are pressures or pressure differences, and said target values are preferably the desired values at the end of the step;

the target value(s) is (are) determined using adsorption process simulation software, taking into account the specific characteristics of each adsorber;

before step a), a step of determining the target values for each adsorber is carried out;

the target values are re-assessed periodically;

the target values are determined, by calculation or experimentally, using optimal search software in a multivariable process.

As mentioned above, at least one adsorber can follow a different adsorption cycle from that of the other adsorbers.

This is a voluntary action brought about by the adjustment according to the invention and not an involuntary disruption of the cycle (leak, blockage, valve problem, etc.).

It is still possible to say that all the adsorbers, including the one having at least one different pressure from those of the other adsorbers due to the individualized adjustment, follow the same adsorption cycle.

It should be noted that since some steps of a PSA by their very nature take place at constant or almost constant pressure, a difference in flow between adsorbers will not in this case lead to a variation in pressure. For example, during a production phase, more or less feed gas can be introduced and in turn more or less production gas drawn off, without modifying the pressures. The target value is then the amount of feed gas introduced, for example. To maintain a constant phase duration, it is possible to alter either the flow rate or the effective feed duration by increasing or reducing a dead time. In this case it can be said that not only the adsorption cycle but also the pressure cycle remains the same for all the adsorbers, but at least one of the adsorbers will have a different target value from the others for the step in question.

The target values may have one or more of the following characteristics:

The target values are determined using adsorption process simulation software, taking into account the specific characteristics of each adsorber.

The target values are determined by means of an experimental campaign.

The target values are re-assessed periodically and the new values introduced into the monitoring and control system.

The target values are determined, by calculation or experimentally, using optimal search software in multivariable processes.

The target values which optimize the process and are thus the set points for the adjustment (as already explained, both expressions are used without distinction, where target value refers more to the process and set point to the adjustment) will not generally all be differentiated by adsorber. In practice, this differentiation will apply only to some steps, for example one or two. Therefore, in the process simulation software, a certain number of target values that are common to all the adsorbers will be fixed and the others will be allowed to vary around a base value, for example the value determined initially assuming that the N adsorbers are completely identical. Rather than systematically calculating all the possible cases, the number of which rapidly becomes very large once processes comprising more than 2 adsorbers are considered and once the target values for more than one step are to be individualized, it will be preferable to use methods that enable the optimum to be arrived at more quickly. The process simulation software is then used in combination with optimal search software in multivariable processes. This software automatically determines the cases to be tested or simulated in order to avoid a long, exhaustive study. In practice, in complex cases, only this combination enables results to be obtained within a reasonable time frame.

The invention will be described in more detail by reference to FIG. 2. Of interest here is the provision of elution gas (or Purge Providing) by an adsorber A to an adsorber B in an elution step and then, in reverse, the provision in turn of elution gas by adsorber B to adsorber A in an elution step. The flowing fluid is generally a gas rich in poorly adsorbable constituents which helps with desorption of the most adsorbable compounds. For example, the gas is substantially hydrogen in the case of a PSA-H2 unit or oxygen in the case of a VSA-O2 or VPSA-O2 unit. In our case, adsorber A will provide the gas in question by decompressing it to a final pressure Pf of 3 bar abs, while adsorber B is at a pressure close to atmospheric pressure.

The flow control device is the valve 1, the detection device is the pressure sensor 3 for adsorber A and 4 for adsorber B. The monitoring and control unit is indicated by reference sign 2. The various dashed lines show the connections between the equipment items and the control unit. The roles of adsorbers A and B will then be reversed but, in the present adjustment principle, the final target value will of course be Pf equal to 3 bar abs. In practice, this value is common to both adsorbers and more generally to the N adsorbers meant to follow the same pressure cycle.

By contrast, according to the invention, two and more generally N target values Pf(i) will be defined, at least one of which will be different from the others in order to comply with the invention. For example, in this case optimum performances would be obtained for Pf(A)=3 bar abs and Pf(B)=2.9 bar abs. We will come back later to the reasons why this optimum is different from the theoretical value.

This approach is innovative because it is the opposite of the usual procedure. Once a PSA unit has been started with the design target values, an additional adjustment (often known as fine tuning) may be carried out later, which may initially consist in making minor changes to some control set points (always identical for the N adsorbers) with a view to improving performance. Checks will also be made to ensure there are no imbalances between adsorbers, despite the adjustment which is aimed at establishing identical operation, and, where that is not the case, the imbalances will be corrected by making changes to, for example, the actions (proportional, integral, etc.) of the control loops, the valve opening and closing speeds, the data acquisition speed, etc. The aim here is to equalize the operation of the N adsorbers, which theoretically leads to the optimum performance of the unit. By contrast, the very principle of the invention is to create minor imbalances around an operation where all the target values would be the same for the N adsorbers, which imbalances, because of the lack of complete similarity between the N adsorbers, enable the overall performance of the unit to be improved.

According to preferred variants, the method according to the invention concerns
- an adsorption step. Depending on the cycles that are implemented, it may be desirable to tie the end of the adsorption step to a high pressure in the case of adsorption at increasing pressure for example, to a duration, optionally to an analysis, to a temperature in the case of a significant heat front, etc.
- an equalization step between adsorbers or between an adsorber and a vessel. As we have already explained, an equalization may be complete, i.e. at the end of the step the pressure of the depressurized adsorber is almost equal to the pressure of the repressurized adsorber. The term "almost" means here that there is still a slight pressure difference between adsorbers, say 25 mbar. This is simply due to the fact that the duration of the step would have to be extended or the size of the valves and pipes increased in order to obtain a further equalization of the pressures. This is an economic difference that is not associated with the adsorption process itself. On the other hand, it may be advantageous for performance reasons to have a partial or incomplete equalization. A residual pressure difference between the two adsorbers of say 1 bar is then specified.
- an elution gas provision step (Purge Providing). This is the case corresponding to FIG. 2.
- a depressurization step. This step generally follows the above step and the final pressure may be the residual network pressure at the site. If the pressure of said network fluctuates, it is customary to maintain a pressure that is higher than the network pressure in order to avoid destabilizing the PSA. The pressure set point can then be individualized for each adsorber if necessary.
- a repressurization step. The final repressurization, after any equalizations, can be carried out in a number of successive substeps with fluids of different origins (feed gas then production gas, for example). In this case too, pressures or pressure differences can be defined, which may be individualized.
- a step comprising both the provision of elution gas and an equalization or repressurization. As in the previous cases, an end-of-step target value can be defined for each adsorber. The distribution of gas between these two uses requires an additional adjustment or regulation which is not covered by the principle of the invention.

The steps listed above are those most commonly used in PSA processes and for which it may be advantageous to individualize the target values that will determine the process that is actually implemented. It should be noted that other steps can also be introduced if, for example, one adsorber provides gas to 2 adsorbers in a single step or groups together transfers that are normally performed successively into a single step. The principle of the invention applies to all PSA types, regardless of the number of adsorbers and storage vessels, the steps implemented and the way in which they are linked together, since the adsorbers are assumed to follow an identical cycle in theory, as is the case a priori for all processes of this type known to date.

Implementing the principle of the invention may lead to changes in the way in which the target values are generally introduced as set points for adjustment. Taking the example of the successive depressurizations of a PSA, it can be said, in simple terms, that the target values corresponding to the ends of steps are currently provided in a table that can be accessed by the control device. For example, in the case of the cycle shown in FIG. 1, the corresponding data could be entered in a table of the type shown below:

TABLE 1

| DP1 | mbar | 15 | 50 | 100 |
| DP2 | mbar | 20 | 50 | 100 |
| DP3 | mbar | 25 | 50 | 100 |

TABLE 1-continued

| DP4 | mbar | 1000 | 100 | 200 |
| P5 | mbar abs | 3000 | [50] | [200] |

The first column defines the parameter in question, for example the pressure difference between adsorbers at the end of the first equalization (DP1), the second the units, the 3rd the target value (the target is 15 mbar at the end of the first equalization step), the 4th and 5th show, respectively, an alarm threshold and a trigger (or other action) threshold, because a crossing of these thresholds indicates a problem with the running of the unit. Note that these thresholds are shown as the difference relative to the target value in the table. Thus, the target value for the pressure P5 at the end of the elution gas provision step is 3 bar, an alarm is given if the value moves outside the range 2950/3050 and a response will be triggered, for example, outside the range 2800/3200.

These values are common to the N adsorbers and apply to each of them for as long as they are in the step in question.

According to the invention, such a table would have to be provided for each of the adsorbers; this is possible but makes the process more cumbersome.

Given that, after optimization, corrections from one adsorber to the next will be slight, the invention proposes keeping the theoretical base values with their threshold and adding a correction for each adsorber where that enables the overall performance of the unit to be improved.

A data table of the following type would then preferably be used:

TABLE 2

| N | | | | | 1 | 2 | 3 | 4 | 5 | 6 | 7 | 8 | 9 |
|---|---|---|---|---|---|---|---|---|---|---|---|---|---|
| DP1 | mbar | 15 | 50 | 100 | | | | | | | | | |
| DP2 | mbar | 20 | 50 | 100 | | | | | | | | | |
| DP3 | mbar | 25 | 50 | 100 | | | | | | | | | |
| [DP4 | mbar | 1000 | 100 | 100 | | | | | 25 | | −30 | | |
| P5 | mbar | 3000 | [50] | [200] | | −20 | | | | +25 | | | |

This means that all the theoretical target values are retained except for adsorber 2, for which the target value for the pressure P5 becomes 2980 bar, adsorber 3, for which the set point at the end of equalization 4 is adjusted to 1025 mbar, and for adsorber 6, for which both these set points are adjusted.

It should be noted that these corrections do not affect all the steps or all the adsorbers. In addition, they are relatively slight and in many cases are below the thresholds that would warn of a start of loss of control by the control system. We will return to these points in the example given below.

Thus, in accordance with a preferred implementation, the adjustment method according to the invention is characterized in that the target value is in the general form X+delta Xi, where X is the common set point in respect of the N adsorbers and delta Xi is the deviation from this common set point in respect of the equipment i.

As we have seen, the basic principle of the invention is that of differentiating the pressure cycles for each adsorber by introducing a corrective term (delta Xi) where that improves the overall performance of the unit. The easiest way of determining these corrective terms, where possible, is to arrange an optimization campaign after the start-up of the unit or preferably periodically, for example on an annual basis.

These observations are illustrated by the following example, which relates to a VSA unit producing oxygen with a purity of 90 mol % from atmospheric air. The VSA, shown in FIG. 3, comprises 3 identical adsorbers 1, 2, 3, following in theory the same pressure cycle with a time lag of a phase time of 30 s, an air blower 5 drawing in atmospheric air 4, and a positive displacement vacuum pump 7 pumping out the residue 6. The production of O2 8 is continuous. Reference signs 9, 10 and 11 correspond to valves for controlling the pressure cycle. The low pressure Pm is adjusted by means of the rotational speed of the vacuum pump 7. The production and repressurization valves 11 are used to maintain the high pressure (PM). Note here that individualizing the high pressure (PM) and/or low pressure (Pm) for each adsorber, which could be done by various means (opening valves, dead times, machine speed, etc.), is not proposed for this cycle. It was found that differentiating these values did not bring about a significant improvement in this cycle, and looking at other steps was more advantageous in this regard.

The corresponding pressure cycle is illustrated in FIG. 4. Time values are plotted on the x-axis and pressure values on the y-axis. T represents the cycle time (90 s), T/3 and 2T/3 the end of the first and second phases respectively. Adsorber 1 is in the production phase with a step (a1) dedicated solely to production and a step (b1) during which the final repressurization of adsorber 3 takes place at the same time. Adsorber 2 starts with a depressurization phase (b1) during which the gas that is extracted is used for the elution of adsorber 3 and is involved in its recompression. The second step is devoted to vacuum pumping (b2). As we have already seen, adsorber 3 passes through an elution step at increasing pressure followed by a step of repressurization with oxygen. We can see that the durations (a1), (b1) and (c1) must be identical and that the same applies to (b1), (b2) and (b3). These parameters cannot be individualized for each adsorber.

In this type of VSA cycle, the amounts of oxygen exchanged between adsorbers are important in terms of the net production of the unit 8. In FIG. 4 we can see that adsorber 3 receives gas from adsorber 1 and adsorber 2 and, since the operation is cyclical, each adsorber supplies gas to and receives gas from the other two.

It is assumed here that the high pressure and low pressure are not adjusted individually. This is linked to the pressure cycle and to the machines used. For other cycles, such as VPSA, these high and low pressures are parameters which can be adjusted more easily, and these pressures would then be individualized for each adsorber in the same way as the intermediate pressures.

Since the high and low pressures are fixed, the cycle is described by means of 3 pressures: P1, the pressure at the end of decompression, P2, the pressure at the end of elution at increasing pressure, and P3, the pressure at the end of repressurization with oxygen. In theory P3=PM, but in practice, as with the equalizations, a deviation is set, say 30 mbar, so as to avoid having to unduly increase the size of the valves or pipes. As for P1 and P2, they are not independent, since P1 directly influences both the amount of gas transferred and the speed of the vacuum pump. For example, if P1 changes from 0.7 bar abs to 0.6 bar abs, with a high pressure of 1050 bar abs, the vacuum pump has less gas to discharge and should slow down slightly to maintain Pm. In practice, the effect on the low pressure Pm is slight and the speed of the vacuum pump is usually fixed. As we have already mentioned, it is possible to modify this speed for each phase time and to individualize the low pressure values Pm(i) if required.

The principle of the invention is not limited to optimizing the cycle by adjusting a value of P1 and P3 (or the difference between P3 and PM) common to the 3 adsorbers; instead the possibility is provided of individualizing these values for each adsorber P1(1), P1(2), P1(3) and also P3(1), P3(2) and P3(3).

This optimization can deliver increases in purity of 1% and more, in turn resulting in the same purity with a flow rate increased by several percent.

The differences that are introduced between the adsorber set points are relatively small, from 10 to 30 mbar. Thus, the operation of the unit will be optimal for values of P1(1), P1(2) and P1(3) of respectively 0.685, 0.70 and 0.695, the values of P3 remaining substantially the same.

In the case of a PSA with 2 or 3 adsorbers, the optimum value of a parameter can be determined by means of tests. Assuming it takes 50 cycles to stabilize the PSA after a slight modification, i.e. just over one hour in the present case, it is possible to carry out around forty tests in 48 hours, especially since these tests can be carried out automatically. Variations in climatic conditions, between day and night for example, should be taken into account, in this case by carrying out a dry run over 24 hours (without changing the cycle parameters). In the present case, the pressures 0.685, 0.700 and 0.715 bar abs are to be tested systematically, amounting to 27 preliminary tests. We will see that the set of values 0.685, 0.700, 0.700 originally used and the ten or so additional tests, for example, will enable the optimum to be fine-tuned. It should be noted that firstly this method is somewhat small-scale and secondly that it can only be used because we are looking for an optimum around a point that is known to be very close, in this case a pressure P1 of 0.7 bar abs. A priori, this last point is true for all operational PSA units, in that a cycle close to the optimum cycle is known from experience, pilot-plant testing, simulation, etc. By contrast, if there is a need to optimize 2 or 3 parameters simultaneously or if there is a large number of adsorbers (>3), specific optimal search algorithms should be used, which limit the number of tests to be carried out.

Thus, according to an additional embodiment, the method for adjusting a PSA gas separation unit according to the present application uses specific optimal search methods and/or software in the case of multiple variables in order to determine the Xi values, and more particularly the delta Pi and/or delta DPij values, corresponding to an optimal operation of the unit.

There is no need to go into detail here about these methods, which can be complex and which moreover have been covered by specialist publications.

What we now need to understand is why the 0.68, 0.70, 0.695 solution of the example—and more generally why set points individualized according to the adsorbers—can improve the overall performance of a PSA unit.

We can rule out from the start the possibility of decalibrated sensors giving incorrect information, which would be corrected by adjusting the set points. The sensors used in this type of unit are reliable, robust and regularly calibrated or have a self-calibration system. If it were simply a case of compensating for measuring errors, this would be outside the scope of the invention. Nevertheless, the method proposed here can take account of systematic errors provided they are constant and not drifts over time.

In practice, while the adsorbers are assumed to be identical from the point of view of the operation of the unit, there are numerous possibilities of small differences which have an impact on performance. For example, there may be variations in geometry and in the content of the adsorbers.

Variations in geometry correspond to the configurations of the various adsorbers and their piping and to the actual construction of the adsorbers and their internal components. Even if perfectly symmetrical, star-shaped configurations have been proposed, the adsorbers are generally configured in a line, or sometimes even 2 lines if the unit comprises a large number of adsorbers (10 or more). The dead spaces may then differ from one adsorber to another. This parameter is known to have an impact on the results. The configuration can also influence the flows in circulation, especially if several adsorbers are operating in parallel in some steps (for example 2 adsorbers simultaneously in production or elution). Depending on their position on a common collector, some adsorbers will systematically see higher incoming and/or outgoing flows than others. More generally, the routing of the connections will have an impact on pressure losses (effects of lockup pressure, suction, pressure losses due to friction, etc.).

Owing to the construction, in particular due to manufacturing tolerances, there may also be minor variations having an impact once again on pressure losses but also on the volume of active material. These impacts are ordinarily relatively minor given the precautions that are usually taken (optimized configuration, in-process inspection, etc.) but they still introduce differences between adsorbers.

The differences can potentially be much greater when it comes to the content, in spite of the various levels of control. We will consider by way of example the layer of LiLSX zeolite used to separate atmospheric O2 and N2 in VSA-O2 or VPSA-O2 units like that in the example above.

Several tens of tonnes of this adsorbent are commonly used in such units. This product is subject to very precise specifications in terms of dimensions, density, nitrogen adsorption capacity, selectivity between oxygen and nitrogen, etc. Nevertheless, all of these properties are subject to minimum/maximum value ranges and it is an illusion to think that all of the adsorbent has exactly the same properties. For example, it is recommended not to fill the adsorbers one after another using packs of adsorbent manufactured in chronological order but rather to mix them up (start/middle/end of production campaign). It is sometimes possible to sort them so as to form batches in which the average value for the characteristic considered to be the most important is very similar from one adsorber to the next. Nevertheless, there will necessarily still be some variations in this regard.

There are also bound to be differences in the mass of adsorbent used. These differences arise from variations in volume and density. Variations in volume can be controlled in radial adsorbers, in which the thickness of the beds is fixed by being constructed between two grids. In the case of vertical- or horizontal-axis cylindrical adsorbers, the top surface of the adsorbent layer is generally an exposed surface which has to be levelled. Given the relatively small thicknesses of the LiLSX layers (0.5 m on average) and the large diameters of the adsorbers, currently over 3 metres, it is common to have differences of a few percent in the volumes actually filled. The other parameter is the filling density, which can also vary by a few percent. This is because, although the aim is generally to achieve a dense filling, to which end appropriate tools and procedures are used, it is difficult to achieve a completely identical filling from one adsorber to the next. While the values are well below the 10% variation that would occur without taking specific precautions, variations of 1 to 2% are inevitable given the number of parameters involved (variability in the density and shape of the particles, rotational speed of the filling system, flow rate of the particles, height of fall, etc.)

The storage conditions and length of storage, and possible variations in atmospheric conditions during filling, can lead to a slight rise in humidity in the adsorbent, despite the precautions that are generally taken (storage for limited period, sealed packages, presence of a desiccant on the one hand, and stopping the filling process if the relative humidity is too high and using a substantially sealed filling system on the other). This presence of water, even in very small amounts, will also have an impact in the order of one or two percent on the nitrogen adsorption capacity.

To simplify, and returning to our example of a VSA with 3 adsorbers, adsorber 1 can be considered to contain a little more adsorbent than intended and adsorber 3 a little less, causing adsorber 1 to overperform and adsorber 3 to underperform with regard to nitrogen capture. In practice, as we have just seen, this difference can also arise from an N2 capacity differing from production, or from slight contamination during storage or filling, etc. We are moving towards this diagnosis by monitoring the purity of the oxygen at the outlet of each adsorber and comparing the thermal profiles of the adsorbers. We will return later to the diagnostics that can be carried out and the way in which elements can be obtained to this end. Since the amount of air treated by each adsorber can be considered to be identical, adsorber 1 has a margin whereas, conversely, adsorber 3 is likely to rupture prematurely. Therefore, it will be necessary to increase the elution of adsorber 3 somewhat in order to improve the regeneration slightly and to recover an additional adsorption capacity as a result of this improved regeneration. Adsorber 1 supplies the elution gas. In order to increase this amount of gas, the pressure at the end of this step should be reduced slightly, from 0.7 to 0.68 bar abs. This tends to push a little more nitrogen to the head of adsorber 1, which is possible because of the margin. Adsorber 3 supplies elution gas to adsorber 2. As the volume of adsorbent is slightly reduced, this amount of gas is itself somewhat reduced. It can be increased by reducing the end-of-step pressure slightly from 0.7 to 0.695 bar abs. The pressure cycle of adsorber 2 is left unchanged.

It should be noted that this type of argument is very difficult and very often misleading, because there are multiple exchanges between adsorbers and everything is interconnected.

For example, an adsorber may appear "poor" as compared with the others simply because it receives a contaminated flow from one of its neighbours. Therefore, the "problem" adsorber is not the one it appears to be.

For that reason, two complementary approaches have been developed. These two approaches can be used independently or simultaneously.

The first involves using a small pilot unit, in which imbalances are deliberately created, the consequences of which are systematically analysed in order subsequently to be able to make a diagnosis as indicated above with regard to an industrial unit and then correct as far as possible the basic operation in order to optimize production in such conditions. In a VPSA, 95% of the planned initial volume of adsorbent will be placed in the first adsorber and 105% in the second, for example. The pressure cycle then has to be fine-tuned in order to minimize the performance loss as compared with the equalized initial state. The optimal search algorithms with multiple variables already mentioned can be used to find this optimum.

Thus, the method according to the invention can involve making a diagnosis of the operation of the unit and initializing values of Xi and more particularly delta Pi and/or delta DPij on the basis of systematic studies carried out on a pilot unit having deliberate known differences between adsorbers. It is assumed here that a same effect observed on the pilot unit and on the industrial unit will have the same cause and that the same improvement procedure can be applied. This will probably only be one approach, requiring additional tests on site where possible.

The second approach involves pursuing a similar process of differentiation between adsorbers and analysing the differences in behaviour, but this time by means of calculations performed by adsorption process simulation software.

Generally, in order to simplify the calculations, it is assumed in this type of software that all the adsorbers are identical and, in practice, only one adsorber is described, which follows the common cycle. As computers become faster and more powerful, with more sophisticated convergence methods than those used a decade ago, it has become possible to simulate a real unit comprising N adsorbers and from there to introduce specific characteristics for some adsorbers (adsorbent mass, dead spaces, or adsorption characteristics: kinetics, selectivity, etc.). As before, the first step is to carry out calculations with the same pressure cycle, establish all the observable variations (drop in purity at one adsorber outlet, change in thermal profile, duration of vacuum pumping, etc.) in order to obtain diagnostic elements, then start the optimization calculations, still using optimal search software in multivariable processes.

Thus, according to preferred variants, the invention provides:

a method for adjusting a PSA gas separation unit according to one of the previously mentioned characteristics, such that the Xi values and more particularly the delta Pi and/or delta DPij values are determined by means of a process simulator taking account of the specific characteristics of each adsorber relating to, without limitation, the adsorbent materials used (volume, density, adsorption capacity, selectivity, etc.) and to the construction or configuration characteristics (distance, dead space, etc.).

This adjustment method is characterized in that the end-of-step set points Xi (particularly delta Pi and/or delta DPij) corresponding to an optimum operation of the unit are determined using a specific optimal search program combined with the process simulator. Using such a computational process it is possible to simulate many more cases than with a pilot unit and to create more precise diagnostic and optimization procedures. The pilot unit can then be used as a validation tool for the simulation.

Another subject of the present invention is preferably a gas stream separation unit comprising at least two adsorbers A and B which follow a PSA, VSA or VPSA pressure cycle and having means for adjusting the unit according to the invention.

The gas stream is preferably chosen from atmospheric air, a gas containing hydrogen, a gas containing CO2 or a gas containing CO, where said unit is designed to produce, respectively, streams enriched with oxygen, hydrogen or helium, CO2, CO or methane.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for adjusting a gas stream separation unit comprising N adsorbers, where N≥2, each following a PSA, VSA or VPSA adsorption cycle, with a time lag of a phase time, said adjustment method comprising the following steps:
   continuously measuring a physical parameter associated with the gas a) stream entering and/or leaving the adsorber; for at least one phase of the adsorption cycle, wherein the physical parameter comprises at least one value,
   b) determining at least one characteristic value of the physical parameter measured in step a) or a function of the physical parameter;
   c) comparing this characteristic value with a target value; thereby determining a value variation, wherein the target value is a pressure or a pressure difference, and
   d) modifying the flow of the gas stream whereby the characteristic value is equal the target value,
   where steps a) to d) are performed for each adsorber, and where at least one adsorber has a unique target value that differs from the target value of the other adsorbers,
   the target value is in the form: X+delta Xi, where X is a value common to all the adsorbers and delta Xi is a correction to be made to said common value for the adsorber (i),
   the target values being pressures or pressure differences, and said target values being the desired values at the adsorption cycle completion.

2. The method according to claim 1, wherein the target value is determined using adsorption process simulation software, taking into account the specific characteristics of each adsorber.

3. The method according to claim 1, wherein, before step a), a step of determining the target value for each adsorber is carried out.

4. The method according to claim 1, wherein the target value is re-assessed periodically.

5. The method according to claim 2, wherein the target value is determined, by calculation or experimentally, using optimal search software in a multivariable process.

6. A gas stream separation unit comprising at least two adsorbers A and B which follow a PSA, VSA or VPSA pressure cycle and having means for implementing the method of adjusting the unit according to claim 1.

7. The gas stream separation unit according to claim 6, wherein the gas stream is chosen from atmospheric air, a gas containing hydrogen, a gas containing CO2 or a gas containing CO, where said unit is designed to produce, respectively, a stream enriched with oxygen, hydrogen or helium, CO2, CO or methane.

* * * * *